Sept. 20, 1955 P. M. STREY 2,718,079
VEHICLE OPERATED CUSHION MOUNTED GATE
Filed Sept. 7, 1950 4 Sheets-Sheet 1
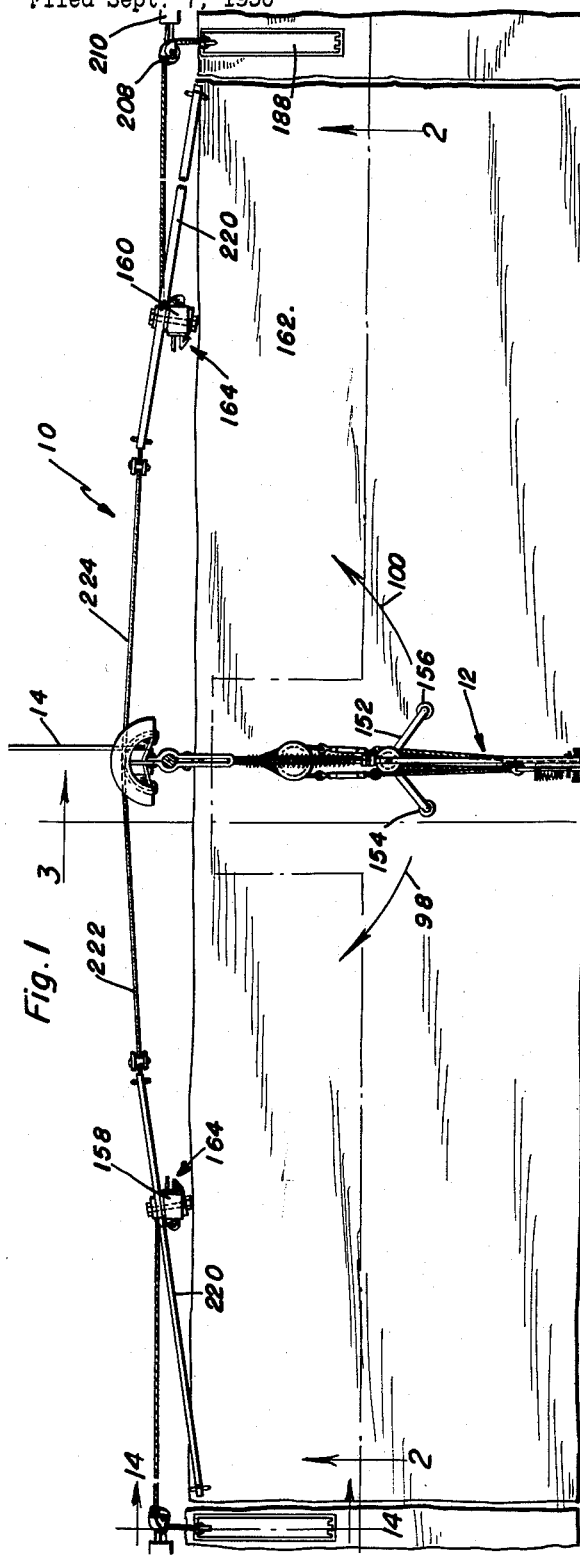
Fig. 1
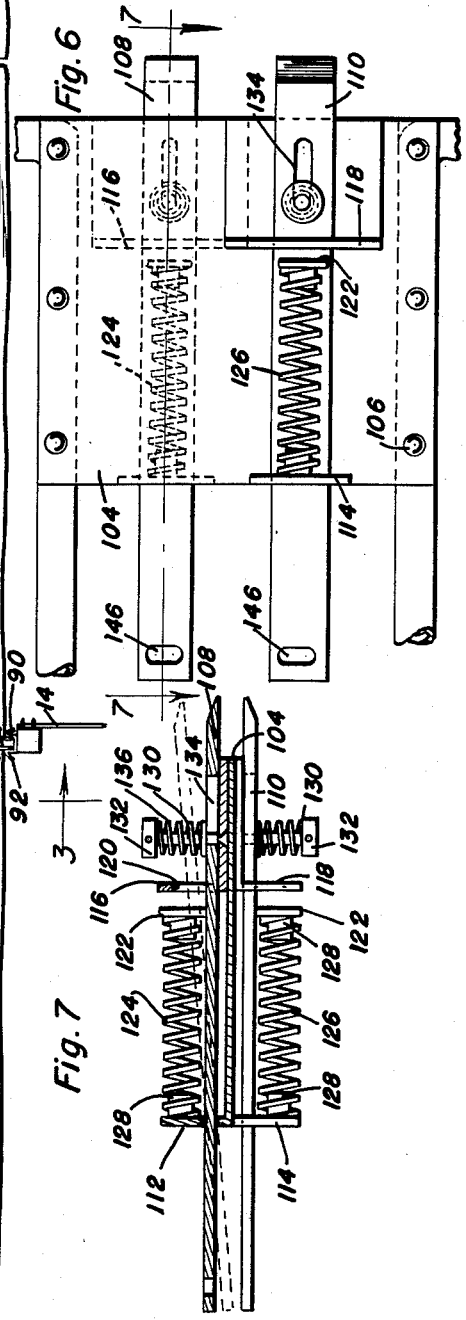
Fig. 6
Fig. 7
Paul M. Strey
INVENTOR.
BY *Clarence A. O'Brien*
*and Harvey B. Jacobson*
Attorneys

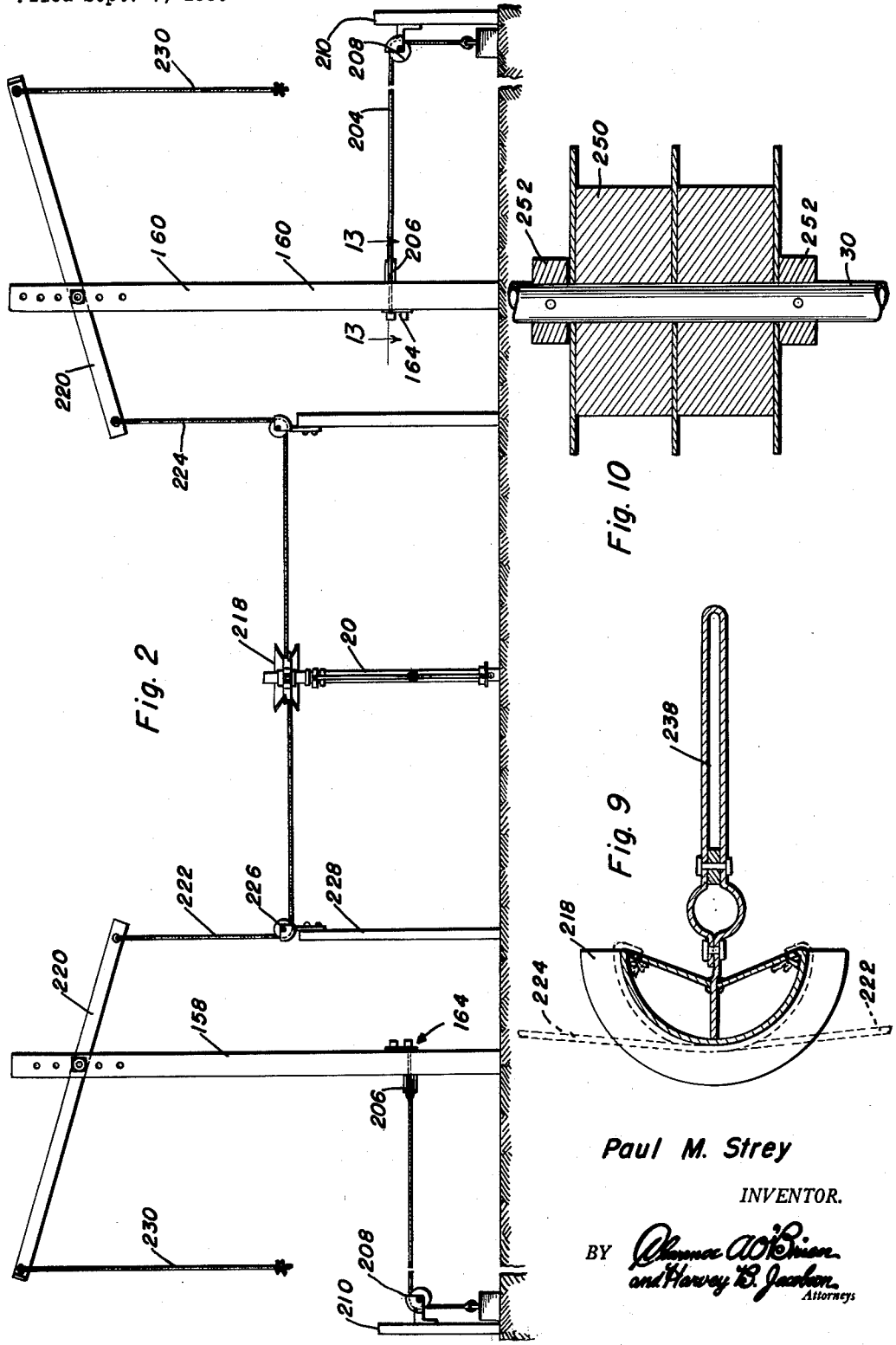

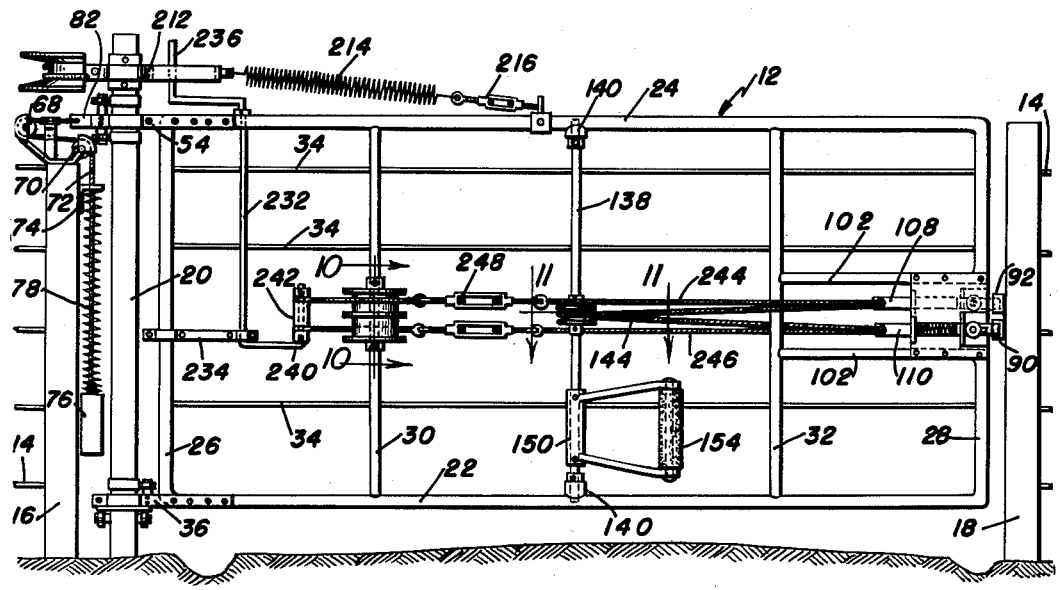
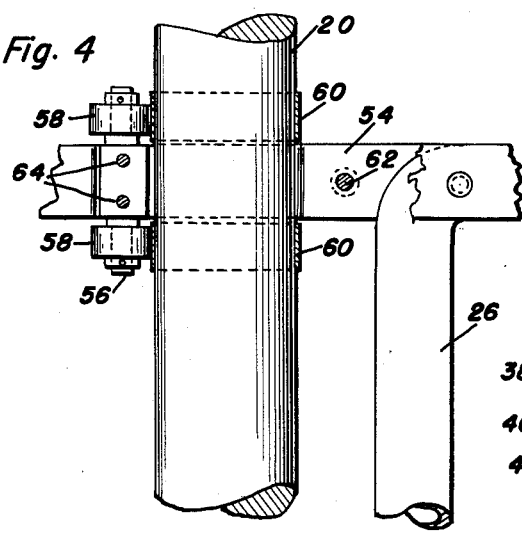
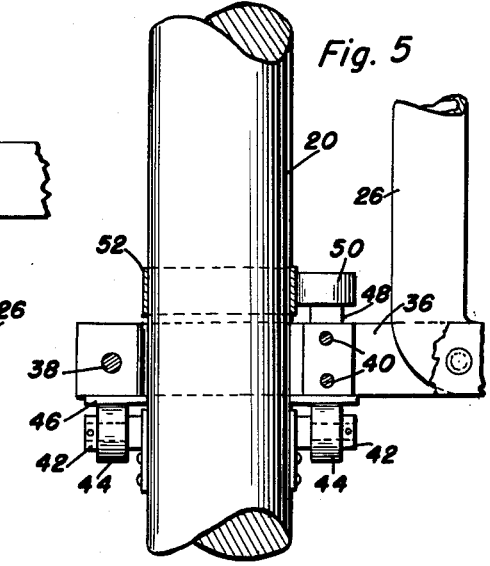

Sept. 20, 1955 P. M. STREY 2,718,079
VEHICLE OPERATED CUSHION MOUNTED GATE
Filed Sept. 7, 1950 4 Sheets-Sheet 4
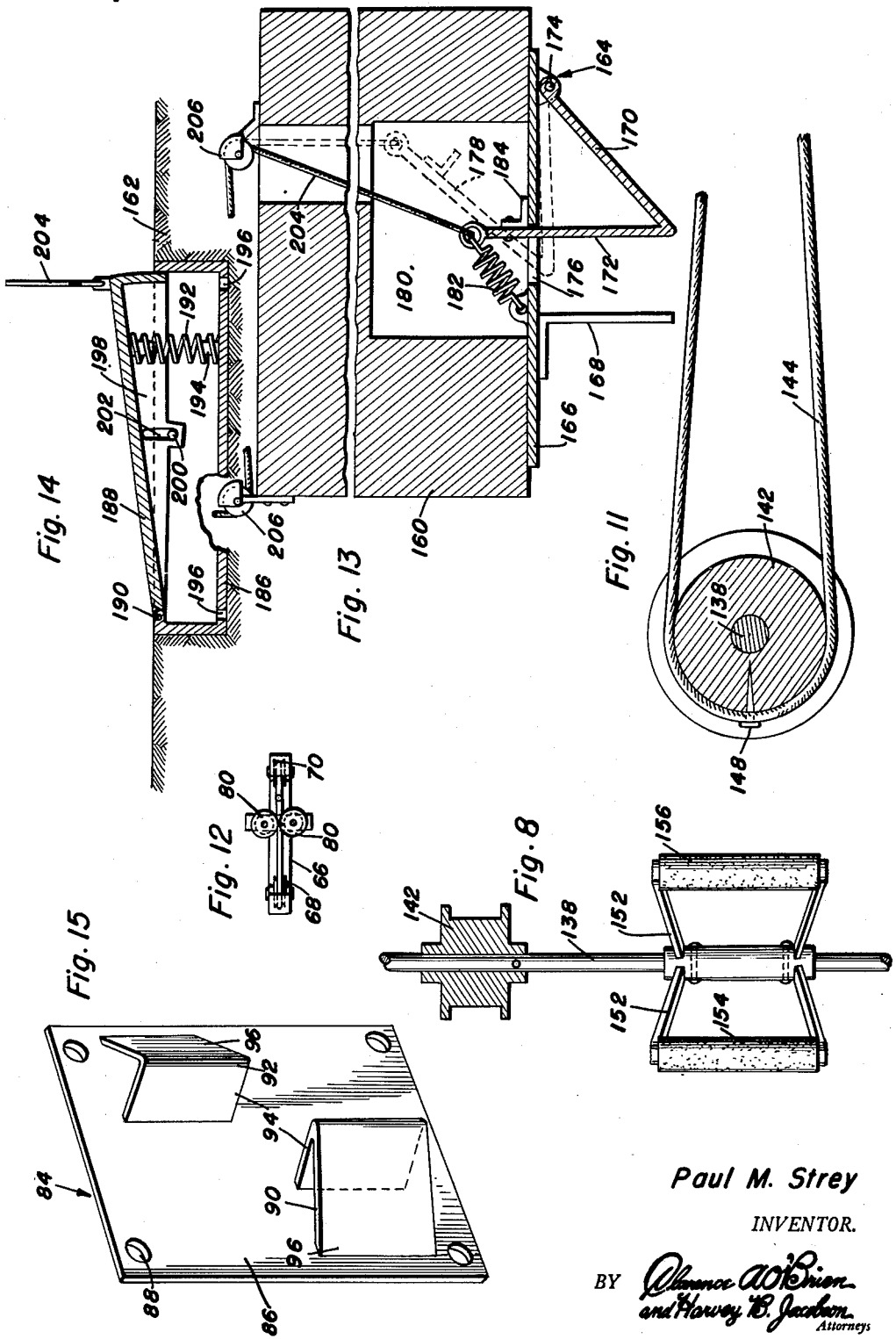
Paul M. Strey
INVENTOR.

United States Patent Office 2,718,079
Patented Sept. 20, 1955

2,718,079
VEHICLE OPERATED CUSHION MOUNTED GATE

Paul M. Strey, Reedpoint, Mont.

Application September 7, 1950, Serial No. 183,500

8 Claims. (Cl. 39—22)

This invention relates to new and useful improvements in gate constructions for use in stock fences.

The primary object of this invention is to provide a gate which is normally latched in a closed position and which may be unlatched and opened to either side of the fence by the operator of a vehicle approaching the closed gate either by hand or by the vehicle without requiring the necessity of dismounting from the vehicle.

Still another important object of the present invention is to provide a gate that is self closing and self latching in the closed position, and which gate will be automatically held in an open position upon opening thereof to be subsequently released to close in response to the travel of a vehicle through the gate opening.

Yet another important object of the present invention is to provide a gate in conformity with the preceding objects which gate will close and latch automatically and which gate will be stopped upon closing with a minimum shock to the gate, the gate post and the latching means.

A meritorious feature resides in the means for latching the gate in the closed position, which means includes a pair of longitudinally reciprocable latch members for preventing opening movement of the gate in opposite directions, and each of which latch members is permitted a limited degree of lateral swinging movement against a spring to relieve shock upon the latch members being swung into engagement with the gate post carried latch keepers.

Another important feature of the present invention resides in the means engageable by a vehicle approaching the gate from either side for releasing the latch members of the preceding paragraph from the latch keepers and by which means the gate may be swung into an open position.

Still another important feature of the present invention resides in the means provided for releasing the gate from its latched closed position by hand from a vehicle approaching the gate and for resiliently urging the gate to an open position.

Yet another important feature of the present invention resides in the means provided for yieldingly urging the gate to its closed position.

A final important feature to be specifically enumerated herein resides in the means by which the gate is swingably mounted on a gate post.

These, together with various ancillary objects and features of the invention which will become apparent as the following description proceeds, are attained by the present invention, a preferred embodiment of which has been illustrated by way of example only in the accompanying drawings, wherein:

Figure 1 is a top plan view of a gate constructed according to the principles of the instant invention;

Figure 2 is a vertical sectional view of the construction shown in Figure 1, this view being taken upon the plane of the broken section line 2—2 of Figure 1;

Figure 3 is a vertical sectional view of the construction shown in Figure 1 and showing the gate itself in side elevation in which concealed portions thereof are indicated in dotted outline, this view being taken upon the plane of section line 3—3 of Figure 1;

Figures 4 and 5 are fragmentary detail views of a manner by which the gate is swingably mounted upon the gate post, Figure 4 showing the manner by which the upper portion of the gate is swingably mounted on the gate post, and Figure 5 showing the manner by which the lower portion of the gate is swingably mounted upon the gate post;

Figure 6 is a fragmentary side elevational view on an enlarged scale of the gate carried latching means, concealed portions thereof being shown in dotted outline;

Figure 7 is a horizontal sectional view of the gate carried latching means showing an alternative position of one of the latch members in dotted outline, this view being taken upon the plane of the section line 7—7 of Figure 6;

Figure 8 is a detail view, partially in section, of the means engageable by a vehicle for unlatching and opening the gate;

Figure 9 is a horizontal sectional detail view of the hand operated actuating lever for unlatching and opening the gate;

Figure 10 is a vertical sectional detail view taken upon the plane of the section line 10—10 of Figure 3;

Figure 11 is another sectional detail view, this view being taken upon the plane of the section line 11—11 of Figure 3;

Figure 12 is a top plan detail view on an enlarged scale of a portion of the means provided for yieldingly urging closing movement of the gate;

Figure 13 is a horizontal sectional view on an enlarged scale of the latch keeper structure for holding the gate in an open position, this view being taken upon the plane of section line 13—13 of Figure 2;

Figure 14 is a vertical sectional view on an enlarged scale of the means provided to be engaged by a vehicle passing thereover for releasing the gate from the latched open position, this view being taken upon the plane of the section line 14—14 of Figure 1; and Figure 15 is an enlarged perspective view of a latch keeper construction for holding the gate in the closed position.

Reference is now made more specifically to the accompanying drawings, wherein like numerals designate similar parts throughout the various views, and in which the gate construction is designated generally at 10.

As best shown in Figures 1 and 3, the gate construction 10 includes a gate designated generally at 12, which when in the closed position is disposed in alignment with a stock fence 14, the gate 12 being disposed in an opening in a stock fence 14 designed by the fence posts 16 and 18. As best shown in Figure 3, the gate construction 10 includes a gate post 20 fixedly positioned adjacent one of the fence posts 16. The gate 12 may be of general construction, and preferably includes a rectangular frame consisting of vertically spaced horizontal members 22 and 24 connected at their opposite ends by upright end members 26 and 28, the horizontal members 22 and 24 being connected at spaced intervals intermediate their ends by upright members 30 and 32, and the end members 26 and 28 being connected at spaced intervals intermediate their ends by horizontal members 34. As best shown in Figures 3 and 5, a mounting bracket 36 formed of complemental sections is secured to the horizontal member 22 to project horizontally from one end of the gate 12, the projecting ends of the sections forming the bracket 36 being formed with complementary concaved portions which receive the gate post 20 therebetween, the complementary sections of the bracket 36 being suitably secured together by means of suitable fasteners 38, 40. A pair of oppositely extending stub shafts 42 are secured to the post 20 below the bracket 36, it being understood that the stub shafts 42 may be of integral construction extending through suitable openings in the post 20, and rollers 44 journaled on the shafts 42 engage the underside of an annular bearing plate 46 that slidably embraces the post 20 and is suitably secured to the underside of the bracket 36 so as to support the lower portion of the gate 12 for swinging movement about a vertical axis with a minimum amount of friction. In order to compensate for the thrust imposed upon the post 20 by the lower portion of the gate 12, the bracket 36 carries a vertical shaft 48 interposed between the gate 12 and the post 20, which stub shaft 48 may be secured to the bracket 36 by means of the fastener 40 extending therethrough, and the shaft 48 has a roller 50 journaled thereon that is in rolling contact with a wear collar 52 that embraces the post 20 above the bracket 36. A bracket 54, similar to the bracket 36, is secured to the horizontal member 24, and the bracket 54 is provided with an oppositely extending vertical shaft 56 upon which oppositely extending ends are journaled rollers 58 that engage by rolling contact wear collars 60 embracing the post 20 above and below the bracket 54, it being understood that the bracket 54 is formed of complemental sections having concaved portions receiving the post 20 therebetween with such sections being secured by fasteners 62 and 64, the latter mentioned fasteners 64 also serving to secure the shaft 56 to the bracket 54.

As thus far described, it will be seen that the gate 12 is swingably mounted on the post 20 in such a manner as to minimize wear and friction, and that by virtue of the rollers 58 being disposed on the side of the post opposite the roller 50 the thrust due to the gate 12 projecting laterally from the post 20 is amply compensated for.

Means is provided for yieldingly urging the gate 12 to its closed position in alignment with the fence 14. Such means are best shown in Figures 3 and 12, wherein it will be seen that the fence post 16 carries at its upper end a bracket 66 having mounted thereon vertically and horizontally spaced guide pulleys 68 and 70 over which is entrained a flexible rope or cable 72. The lower end of the cable 72 slidably extends through a suitable aperture provided in an angle bracket 74 fixedly secured to the fence post 16 and carried at its lower end a weight 76. In addition, a compression spring 78 embraces the cable 72 and is seated between the bracket 74 and the weight 76 to assist the weight 76 in urging the cable 72 downwardly. The upper end of the cable 72 after passing over the guide pulley 68 passes between a pair of oppositely disposed guide pulleys 80 also carried by the bracket 66 (see Figure 12) and has its free upper end secured to an extension 82 carried by the bracket 54 on the end thereof remote from the gate 12. It will be understood that the arrangement is such that the tension produced in the cable 72 by the weight 76 and the spring 78 will act on the extension 82 of the bracket 54 to yieldingly urge the gate 12 into alignment with the fence 14 irrespective of the direction in which the gate 12 may be displaced from its neutral closed position.

Means is provided for latching the gate 12 in its closed position. Such means include a latch keeper designated generally at 84 (see Figure 15) which is suitably secured to the side of the fence post 18 facing the gate 12, such latch keeper 84 including a plate 86 having apertures 88 therein through which suitable fasteners extend to secure the plate 86 to the fence post 18. A pair of vertically and horizontally spaced latch keeper elements 90 and 92 are secured to the plate 86 as by welding or the like, such elements 90 and 92 being angulated and having their adjacent faces 94 disposed vertically to the plate 86 and with their remote faces 96 inclined with respect to the plate 86. Latching means is carried by the gate 12 that is adapted to cooperate with the latch keeper 84 to prevent the gate 12 being swung in either direction shown by the arrows 98 and 100 in Figure 1, and which will operate automatically to engage the latch keeper 84 upon the gate 12 being swung to the closed position, and furthermore which will cushion and absorb the shock of the stoppage of the gate 12 upon the latter being swung to its closed position with the latch means engaging the latch keeper. Such means comprise a pair of vertically spaced horizontal rails 102 connecting the vertical member 32 and the end member 28 which are connected at their ends adjacent the vertical end member 28 by a plate 104, the latter being secured thereto by rivets or other suitable means 106. Longitudinally reciprocable elongated latch members 108 and 110 are disposed on opposite sides of the plate 104 and are vertically spaced with respect to each other so as to be disposed in the horizontal planes of the latch keeper element 92 and 90 respectively. The plate 104 has provided thereon vertically spaced and oppositely extending flanges 112 and 114, each of which is provided with an aperture slidably receiving the latch members 108 and 110 respectively. In addition, the plate 104 is provided with vertically spaced angle brackets 116 and 118 on the opposite sides thereof having enlarged apertures 120 therethrough through which the latch members 108 and 110 extend respectively.

As thus far described, it will be understood that the latch members 108 and 110 are longitudinally reciprocable through the apertures provided in the flanges 112 and 114 respectively, and through the apertures 120 in the brackets 116 and 118 respectively. It will be further appreciated due to the enlarged size of the apertures 120 in the brackets 116 and 118 the latch members 108 and 110 may be swung outwardly to an extent determined by the size of the apertures 120 as indicated by the alternative position of the latch member 108 shown in dotted outline in Figure 7. Independent resilient means are provided for each of the latch members for urging the same into their full line positions shown in Figure 7. In order to urge the latch members to the right as shown in Figure 7, each of the latch members is provided with a laterally extending flange 122, and coiled compression springs 124 and 126 are seated between the flanges 122 and the flanges 110 and 112 respectively, opposed bosses 128 being provided on the flanges that project into the opposite ends of the springs 124 and 126 for retaining the latter in assembled relation. In order to urge each of the latch members 108 and 110 towards the plate 104, the latter is provided with oppositely extending, vertically spaced rods 130 which are provided with stop collars 132 at their extremities. The rods 130 project through elongated slots 134 provided in the latch members so that the rods 130 will not interfere with the longitudinal movement of the latch members, and coil compression springs 136 embrace the rods 130 and are seated between the stop collars 132 and the latch members. The manner in which the latch members 108 and 110 cooperate with the latch keeper 84 upon closing movement of the gate 12 will be readily appreciated upon reference to Figures 6, 7 and 15. Assuming the gate is swung to the closed position in a direction opposite that indicated by the arrow 100 in Figure 1, the bevelled end of the latch member 110 will ride over the inclined face 96 of the latch element 90 against the action of the spring 126 until the latch member 110 has passed over the latch element 90, whereupon the spring 126 urges the latch member 110 into a position adjacent the vertical face of the latch element 90 to prevent retrograde movement of the gate 12. The swinging movement of the gate 12 is stopped by virtue of the latch member 108 engaging the vertical face 94 of the latch element 92, and the shock of such contact is absorbed by the spring 130 yieldingly resisting swinging movement of the latching member 108 to the alternative position of the same shown in dotted outline in Figure 7. It will be evident that the function of the latching members 108 and 110 will be precisely reversed upon the gate 12 being closed by swinging movement from the other direction.

Means is provided whereby the gate may be unlatched from its closed position and opened directly by contact of a vehicle. This means includes a shaft 138 journaled for rotation about a vertical axis in bearings 140 carried by the horizontal members 22 and 24 of the gate. A pulley 142 is fixedly secured to the shaft 138 to rotate therewith, and a flexible rope or cable 144 is entrained over the pulley 142 and has its free end suitably secured in apertures 146 adjacent the rear extremities of the latch members 108 and 110. As clearly shown in Figure 11, the cable 144 is secured by a fastener 148 to the pulley 142, in such a manner that rotation of the shaft in one direction will slacken one end of the cable 144 while tensioning the other, while reversing the slack and the tension in the ends of the cable 144 upon rotation of the shaft 138 in the other direction. Attention is now directed to Figures 1, 3 and 8, wherein there is shown a sleeve 150 fixedly secured to the shaft 138 that carries vertically spaced pairs of diverging arms 152 that carry journaled therebetween at their extremities cushioned rollers 154 and 156, the rollers 154 and 156 being disposed at a height above the ground adapted to be engaged by the bumper of a vehicle upon the gate 12. The rollers 154 and 156 are disposed upon opposite sides of the gate 12, and the arrangement is such that a vehicle approaching the gate from one direction will engage one of the rollers to first cause rotation of the shaft 138 in such a direction as to tension the end of the cable 144 that engages the latch member preventing swinging movement of the gate 12 in such direction to release the latch member, whereupon further force applied against the roller will cause the gate 12 to swing open in such direction. The vehicle is then free to pass through the gate opening; however, since means previously described are provided to yieldingly urge the gate towards its closed position, the present invention includes further means for holding the gate 12 in its open position until the vehicle has passed through the gate opening so as to prevent the gate 12 striking the side of the vehicle as it passes through the gate opening.

Attention is now directed to Figures 1, 2, 13 and 14, wherein there is shown means for holding the gate in an open position during the passage of a vehicle through the gate opening, and which means is operative upon the passage of the vehicle safely through the gate opening and clear of the gate to release the gate so that the latter may return to its closed position. Such means include a pair of posts 158 and 160 disposed on opposite sides of the gate 12 and along one side edge of a roadway 162 passing through the gate opening. The posts 158 and 160 are spaced the same distance from the gate post 20 as is the fence post 18, so that latch keeper means designated generally at 164 carried by the posts 158 and 160 will be engageable by the latch members 108 and 110 for holding the gate 12 in an open position on either side of the fence 14. Since the latch keeper means 164 provided on the posts 158 and 160 are practically identical in construction, it is believed that the description of such means provided on the post 160 will suffice for both. As clearly shown in Figure 13, a latch keeper means 164 includes a plate 166 suitably secured to the post 160 that carries an angle stop member 168. Spaced above and to one side of the member 168 is an angulated latch keeper element having legs 170 and 172, the free end of the leg 170 being pivoted to the plate 166 at 174. The angulated latch keeper element is swingable through a suitable aperture 176 in the plate 166 to an alternate position designated at 178 in which position the leg 172 is disposed entirely within a chamber 180 provided in the post 160. A tension spring 182 is disposed within the chamber 180 and has one end secured to the plate 166 and the other end secured to the free end of the leg 172 to urge swinging movement of the angulated latch keeper element to the full line position shown in Figure 13, such outward swinging movement being limited by a stop 184 carried by the leg 172 that engages with the plate 166.

As thus far described, upon swinging movement of the gate 12 in the direction indicated by the arrows 100, the latch member 110 will cushionly engage the stop 168 to prevent further opening movement of the gate, while the latch member 108 will pass over the latch keeper element formed on the legs 170 and 172 to engage the leg 172 to prevent retrograde closing movement of the gate, it being noted that the latch member 108 may move over the leg 170 either due to the swinging movement of the latter about the pivot 174 or due to the longitudinal sliding movement of the latch member 108 relative to the plate 104. In any event, the springs 126 and 182 will urge the latch member 108 and the leg 172 into cooperating relationship to prevent closing movement of the gate as soon as the latch member 108 has cleared the leg 170. In view of the vertical spacing of the latch members 108 and 110, it will be obvious that the form of the latch keeper means 164 on the post 158 will be complementary to those on the post 160 for holding the gate open when the latter has swung to an open position in the direction indicated by the arrow 98 in Figure 1.

Means is provided for swinging the legs 170 and 172 into the dotted line position 178 shown in Figure 13 to free the latch member therefrom, which means include an elongated housing 86 (see Figure 14) embedded in the roadway 162 at a considerable distance from the fence 14, at least as far from the fence 14 as the post 160. The housing 186 is provided with an elongated cover 188 hinged thereto at one end at 190. A compression spring 192 is disposed within the housing 186 and is seated between the cover 188 and the bottom of the housing 186 to urge the cover 188 upwardly to a position where the latter projects slightly above the surface of the roadway 162 as will be clearly apparent from the drawings. In addition, opposed bosses 194 are carried by the housing and the cover that project into the opposite ends of the compression spring 192 to retain the latter in position. The bottom of the housing 186 is provided with apertures 196 for the drainage of water therefrom, and the cover 188 is provided with depending flanges 198 that are slidably received in the housing 186 to prevent the housing becoming filled with debris that would cause malfunctioning of the same. Furthermore, the side walls of the housing 186 are provided with inwardly projecting pins 200 that are slidably received in elongated slots 202 provided in the flanges 198 to limit the swinging movement permitted the top 188. It will thus be apparent that a vehicle passing along the roadway 162 will engage the normally raised cover 188 to depress the same, and that after the vehicle has passed thereover the top 188 will be raised by the spring 192 to its normal position. The end of the cover 188 remote from its pivot has secured thereto a flexible cable 204 that is entrained over suitable guide pulleys 206 and 208 carried by the post 160 and a further post 210, the free end of the cable 204 extending into the chamber 180 and being secured to the free end of the leg 172, the arrangement being such that upon depression of the top 188 the latch keeper element formed on legs 170 and 172 is moved into its alternative retracted position shown in dotted outline in Figure 13 to disengage the latch members carried by the gate 12. It will thus be seen that the gate 12 may be unlatched and opened by a vehicle, and that the gate 12 will remain open until the vehicle has moved clear and free of the return path of the gate 12, after which the gate 12 will return to its closed position relatching itself.

Attention is now primarily directed to Figures 2 and 3, wherein there is shown means for unlatching and opening the gate from a position along the roadway 162 remote from the gate 12, which means may be actuated by an operator of a vehicle approaching the gate and is of particular value where the vehicle is of such a character as to not include a bumper or other suitable portion for operative engagement with the rollers 154 and 156. Such means includes an actuation lever 212 journaled intermediate its ends on the gate post 20 above the bracket 54. As will be apparent, the lever 212 is pivoted to the post 20 independent of the gate 12 and has one end resiliently coupled to the horizontal member 24 of the gate 12 by means of a tension spring 214 and a turnbuckle 216, the latter being provided to adjustably tension the spring 214. It will be appreciated at the outset that rotation of the lever 212 in one direction will through its resilient coupling to the gate 12 also resiliently urge movement of the gate 12 in the same direction. In order that the lever 212 may be rotated, the end thereof remote from the spring 214 is provided with what may be conveniently termed a segmented pulley 218 (see Figure 9) substantially concentric with the gate post 20. The posts 158 and 160 are provided with levers 220 that are pivoted intermediate their ends to the post. Ropes or cables 222 and 224 are secured to the adjacent ends of the levers 220 and extend downwardly therefrom to be entrained under guide pulleys 226 carried atop further post 228. The cables 222 and 224 project horizontally from the pulleys 226 and are each entrained over the segmented pulley 218 and have their free ends suitably secured to the remote portion of the pulley 218 from the posts 158 and 160 to which they are attached. As clearly shown in Figure 1, the levers 220 are disposed at an angle to the roadway 162 so that the ends of the levers 220 remote from the gate 12 project over the side edges of the roadway 162 in such a position that the pull ropes 230 secured to the remote end of the levers 220 may be easily reached and pulled by an operator in a vehicle on the roadway. It will thus be seen that when one of the pull ropes 230 is pulled downwardly, the lever 212 is moved to a position resiliently urging the gate 12 for opening movement away from the person pulling the pull rope.

Means is provided operatively connecting the levers 212 to the latch members 208 and 110 to release the latter upon swinging movement of the lever 212. Such means include a shaft 232 journaled for rotation about a vertical axis through a suitable bearing carried by the horizontal frame member 44 of the gate 12 and a journal bracket 234 fixedly secured to the end member 26 of the gate 12. The upper end of the shaft 232 is provided with a crank 236 that slidably projects upwardly through an elongated slot 238 provided in the lever 224 (see Figure 9), whereby relative swinging movement of the lever 212 and the gate 12 actuates rotation of the shaft 232. The lower end of the shaft 232 is provided with a further crank 240 having a sleeve 242 rotatable thereon. Cables 244 and 246 have their opposite extremities secured to the sleeve 242 and the latch members 108 and 110 respectively, such cables having turnbuckles 148 interposed therein for tensioning the same. The upright 30 has journaled a divided idler sheave that is retained on the upright member 30 between retaining collars 252. The cables 244 and 246 extend on opposite sides of the divided idler sheave 250, the arrangement being such that upon rotation of the shaft 232 in one direction retracts one of the latch members 108 and 110, while rotation of the shaft 232 in the opposite direction releases the other latch member. Accordingly, it will be evident that upon pulling one of the pull ropes 230, the lever 212 will be first urged for pivoted movement relative to the gate 12 so as to rotate the shaft 232 and release the latch member, whereupon further movement of the lever 212 will cause the spring 214 to resiliently urge the gate 12 to the open position, whereas previously explained the gate 12 will be retained in its open position.

Although only one of the means responsive to the passage of a vehicle thereover for releasing the latch means 164 has been described in detail, it will be understood that identical means are provided in the roadway on both sides of the gate 12 for actuating not only the latch keeper means 164 on the post 160 but also on the post 158, as will be apparent upon inspection of the drawings.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. In a gate construction first and second spaced posts, a gate, means swingably mounting the gate on the first post, a latch keeper mounted on the second post, latch means mounted on the gate comprising a plate, vertically spaced latch members on opposite sides of the plate, guide means on the plate for longitudinal reciprocation in the latch members, spring means urging movement of the latch members towards the latch keeper, said guide means permitting lateral movement of latch members from the plate, and further spring means urging each of said latch members towards the plate.

2. The combination of claim 1, wherein said latch keeper comprises a base plate having vertically and horizontally spaced latch keeper elements thereon engaging and receiving the vertically spaced latch members therebetween.

3. The combination of claim 2, including a pair of posts on opposite sides of the gate, and releasable latch keeping means carried by each of said pair of posts selectively engaging said latch members to hold the gate in an open position.

4. The combination of claim 3, including means yieldingly urging said gate to a closed position, and means spaced from the gate responsive to a vehicle passing thereover for releasing said latch keeping means.

5. The combination of claim 1, wherein said swingably mounting means includes a pair of vertically spaced horizontally extending brackets carried by the gate that are loosely journalled on the first gate post, a pair of rollers carried by first gate post having rolling contact with the underside of one of the brackets to support the latter during horizontal swinging movement thereof, a roller carried by the lower of said brackets that is rotatable about a vertical axis and which is disposed between the gate and the first gate post and in rolling contact with the latter, a roller carried by the upper of said brackets that is rotatable about a vertical axis and which is disposed on the upper bracket at a position opposite the gate from first gate post and in rolling contact with the latter.

6. In a gate construction, a gate post and a gate, means swingably mounting the gate on the post comprising a pair of vertically spaced horizontally extending brackets carried by the gate that are loosely journaled on the gate post, a pair of rollers carried by gate post having rolling contact with the underside of one of the brackets to support the latter during horizontal swinging movement thereof, a roller carried by the lower of said brackets that is rotatable about a vertical axis and which is disposed between the gate and the gate post and in rolling contact with the latter, a roller carried by the upper of said brackets that is rotatable about a vertical axis and which is disposed on the upper bracket at a position opposite the gate from said first gate post and in rolling contact with the latter.

7. In a gate construction, a gate post having a gate swingably mounted thereon for horizontal movement, a second post, means carried by the gate and the second post for releasably latching the gate in a closed position, an actuating lever pivoted to first mentioned gate post for horizontal swinging movement, spring tension means connecting the lever to the gate for yieldingly urging the gate to follow swinging movement of the lever, and means operatively connecting the lever to the first mentioned means responsive to swinging movement of the lever relative to the gate to release said first mentioned latching means.

8. A cushion lock for use in swinging gate constructions comprising a vertical plate, vertically spaced latch members on opposite sides of the plate, guide means on the plate for longitudinal reciprocation of the latch members, a latch keeper comprising a base plate having upper and lower latch keeper elements thereon engaging the latch members, spring means yieldingly urging the latch members towards the latch keeper, said guide means permitting lateral movement of the latch members from the plate, and further spring means yieldingly urging the latch members towards the plate.

References Cited in the file of this patent

UNITED STATES PATENTS

| | | |
|---|---|---|
| 554,180 | Good | Feb. 4, 1896 |
| 798,663 | Coffits | Sept. 5, 1905 |
| 895,462 | Hoskins | Aug. 11, 1908 |
| 987,574 | Heggen et al. | Mar. 21, 1911 |
| 1,179,629 | Hofer | Apr. 18, 1916 |
| 1,214,594 | Sand | Feb. 6, 1917 |
| 1,446,934 | Schwiesow | Feb. 27, 1923 |
| 1,609,369 | Laird | Dec. 7, 1926 |
| 1,827,173 | Street | Oct. 13, 1931 |
| 2,118,722 | Bock | May 24, 1938 |
| 2,538,470 | Peeples | Jan. 16, 1951 |
| 2,585,481 | Martin | Feb. 12, 1952 |

FOREIGN PATENTS

| | | |
|---|---|---|
| 43,231 | Norway | Oct. 17, 1927 |
| 23,920 | Australia | Aug. 11, 1936 |